United States Patent [19]

Willard

[11] Patent Number: 4,774,783
[45] Date of Patent: Oct. 4, 1988

[54] FISH LANDING NET

[76] Inventor: David D. Willard, 9901 Memorial Dr., Houston, Tex. 77024

[21] Appl. No.: 96,047

[22] Filed: Sep. 11, 1987

Related U.S. Application Data

[63] Continuation-in-part of Ser. No. 827,915, Feb. 7, 1986.

[51] Int. Cl.4 .............................................. A01K 77/00
[52] U.S. Cl. ....................................................... 43/12
[58] Field of Search ..................................... 43/12, 11

[56] References Cited

U.S. PATENT DOCUMENTS

| | | | |
|---|---|---|---|
| 2,482,718 | 9/1949 | Oathout | 43/12 |
| 2,515,685 | 7/1950 | Ash | 43/12 |
| 2,653,404 | 9/1953 | Phaneuf | 43/12 |
| 2,760,291 | 8/1956 | Marsilius | 43/12 |
| 2,921,397 | 1/1960 | Luthi | 43/11 |

Primary Examiner—Gene P. Crosby
Attorney, Agent, or Firm—Kurt S. Myers; David A. Rose

[57] ABSTRACT

A fish landing net having a handle with two openings for receiving two flexible members which form a frame for supporting a net. The flexible members are made to telescope within the handle to reduce length. The flexible members are made for connecting and disconnecting the extended end of the flexible members.

12 Claims, 3 Drawing Sheets

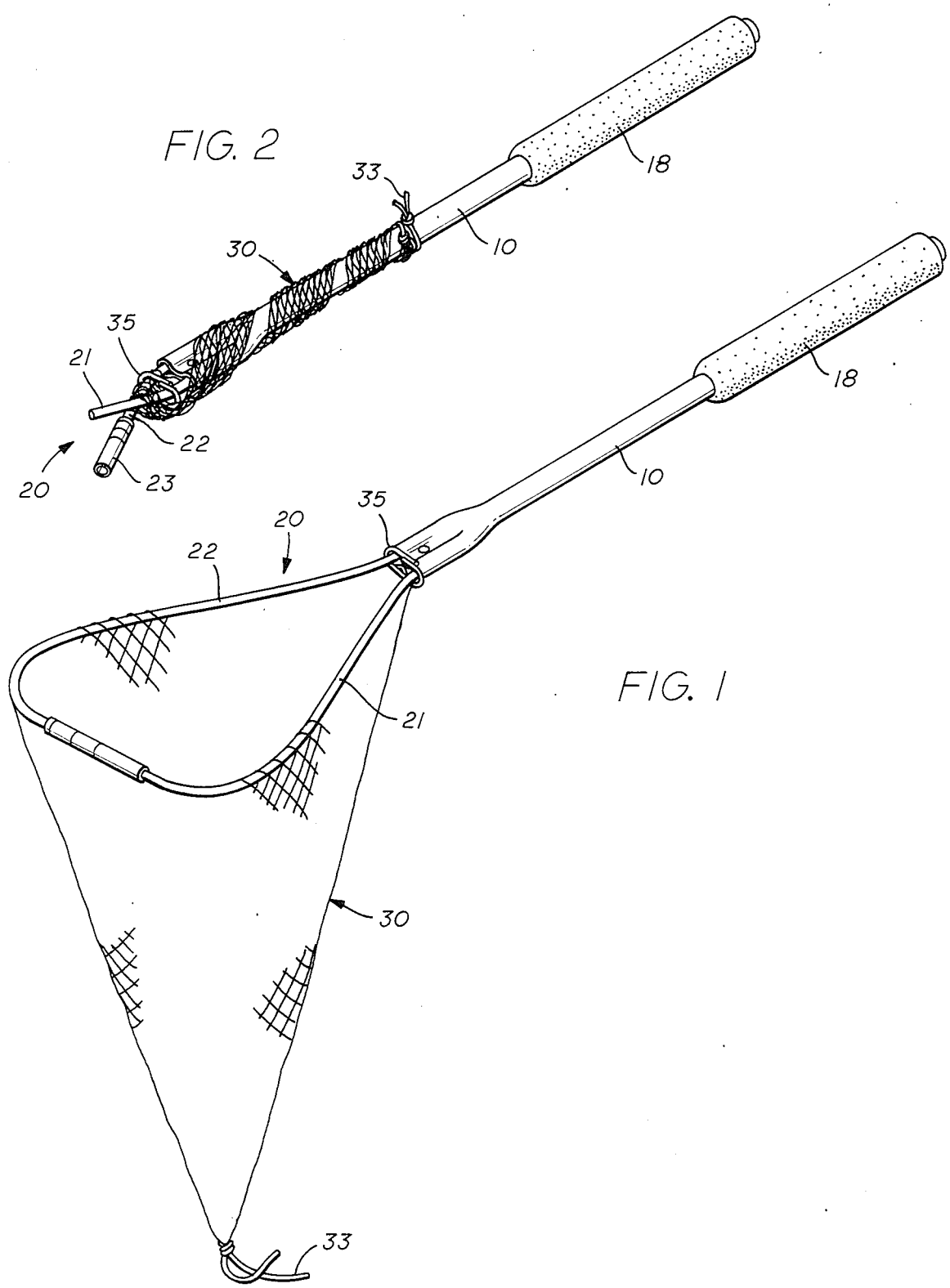

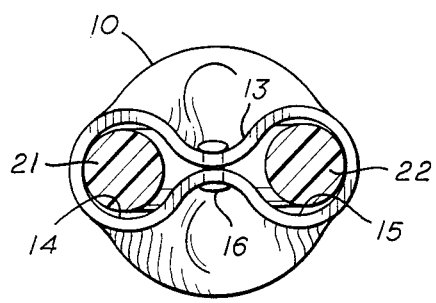
FIG. 4
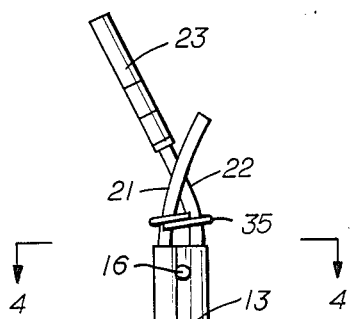
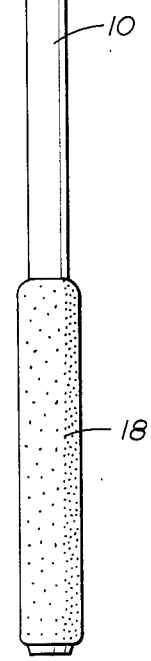
FIG. 3
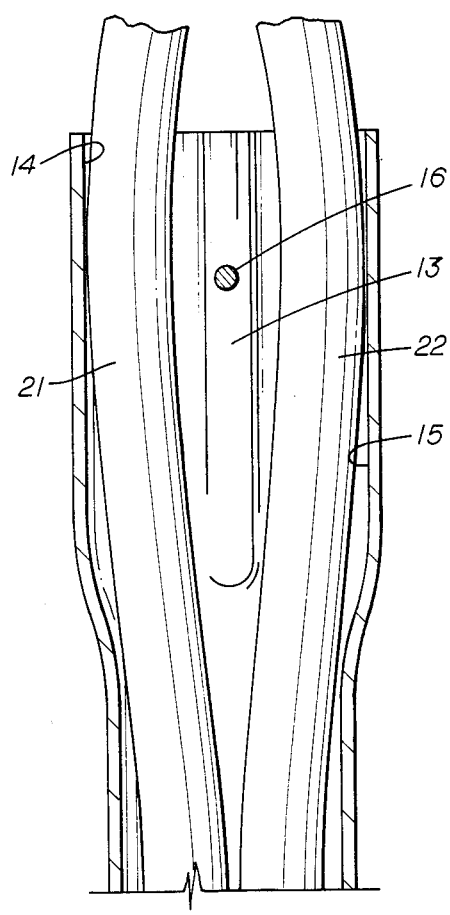
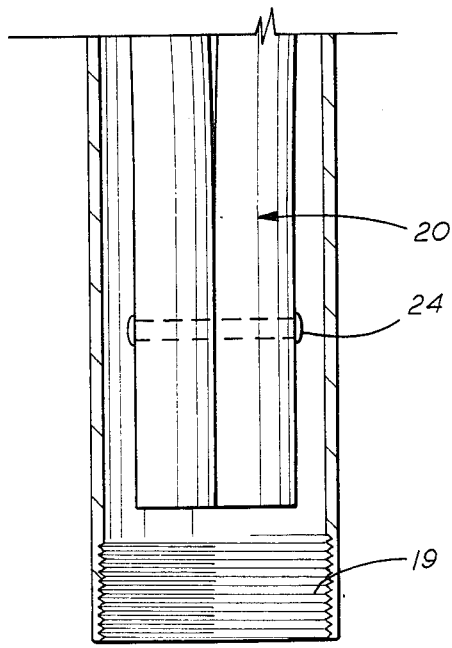
FIG. 5

FISH LANDING NET

RELATED APPLICATION

This application is a continuation-in-part application of design patent application, Ser. No. 827,915 filed Feb. 7, 1986.

BACKGROUND OF THE INVENTION

1. Field of the Invention

The present invention is directed to a fishing net wherein the stock holding the net may be telescopically drawn into the handle. The handle may be a single element or be made of multiple sections and in addition may contain a gig, a gaff or other fisherman's accessory. The fishing net of the present invention may thus be easily stored yet quickly assembled for immediate use in the retrieval of fish.

2. Prior Art

U.S. Pat. No. 3,167,878 discloses a telescopic landing net. The net is carried on a pair of frame arms which may be telescopically extended for in use condition or alternatively retracted into a tubular member.

The landing net disclosed in U.S. Pat. No. 3,224,131 has a pair of frame members extending from a handle which are connected by a resiliant member.

U.S. Pat. No. 3,715,829 discloses a collapsible fishing net. The net is formed by a pair of frame parts having a handle and bowed frame portions. The curved, bowed portions are connected by a flexible interconnecting member.

U.S. Pat. No. 4,263,864 discloses a net and retrieval device. The handle member is made of telescoping tubes. On one end is a hook member and at the other end is a net frame for carrying a net.

A collapsible and telescopic fishing net is disclosed in U.S. Pat. No. 4,138,790. The pair of flexible members making up part of the rim assembly may be telescoped within the housing cylinders which are connected to a yoke assembly. The yoke assembly may be moved up and down on a portion of the handle for collapsing the net.

U.S. Pat. Nos. 3,072,428; 3,150,460; 3,955,302 and 4,004,539 all illustrate various fishing implements which are attachable to a handle or are part of a handle.

SUMMARY OF THE INVENTION

The present invention is directed to a fishing net which comprises a handle, two flexible pieces of supporting frame work which can be telescopically extended from the handle or retracted into the handle, a connector for connecting or disconnecting the ends of the two pieces of stock and a net carried by the supporting frame work or stock.

BRIEF DESCRIPTION OF THE DRAWINGS

The present invention will be more readily apparent from the appended drawings:

FIG. 1 is an isometric view of the net in its fully extended and ready for use position;

FIG. 2 is an isometric view of the fishing net of the present invention in its retracted and storable position;

FIG. 3 is a top view, without the net, showing the supporting frame work or flexible stock members telescopically within the handle;

FIG. 4 is a cross section taken along the line 4, 4 of FIG. 3;

FIG. 5 is a top sectional view showing the internals of the two flexible stock members within the handle;

DESCRIPTION OF THE INVENTION

Figures 6, 7, 8:
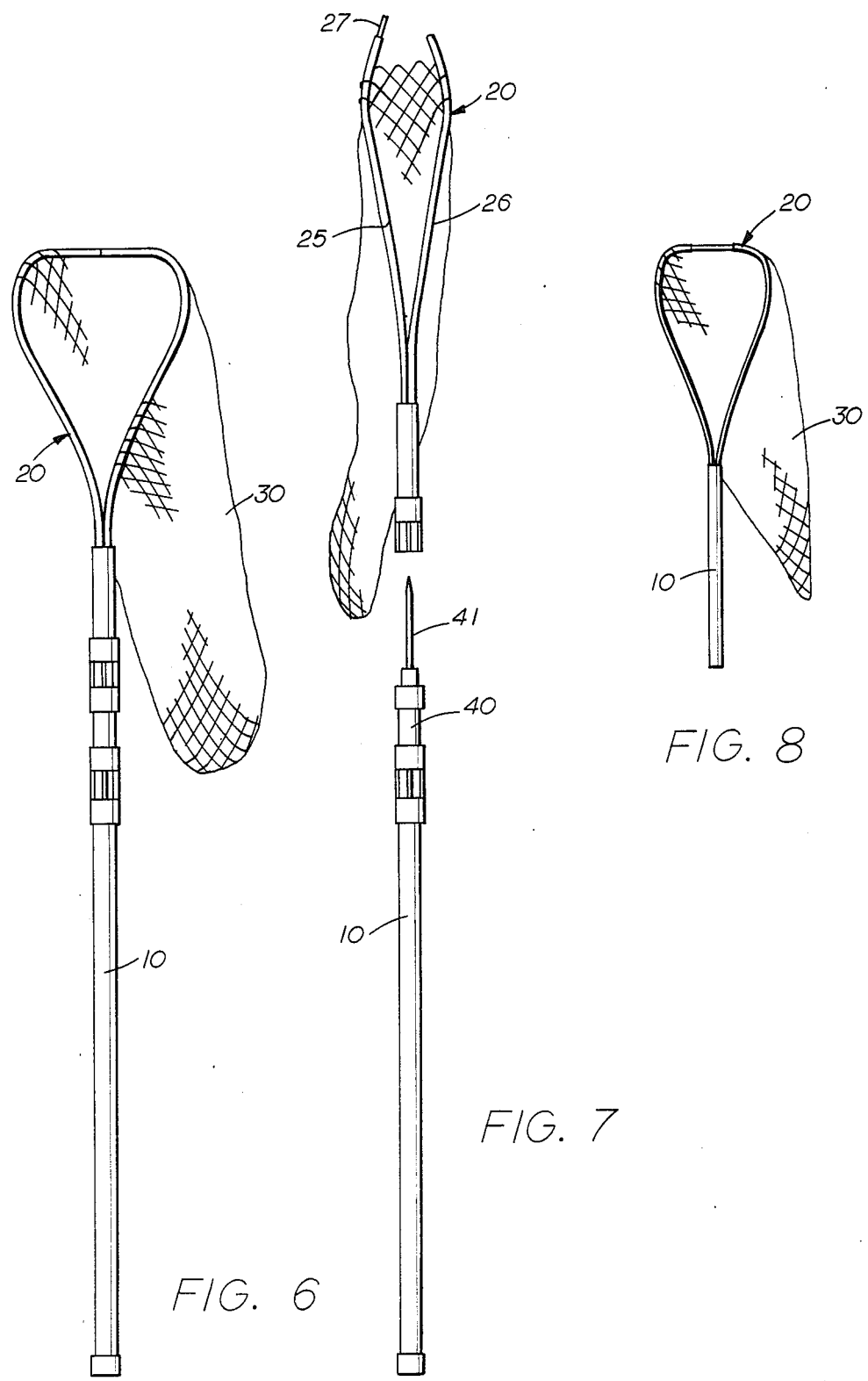
FIG. 6 is a top view of the net with an extended handle, made of multiple sections, having a gig enclosed within the handle.
FIG. 7 is an extended view of the net shown in FIG. 6 taken apart, exposing the gig and also the net supporting frame work or flexible stock members unconnected.
FIG. 8 is another embodiment of the net of the present invention.

Referring now to FIG. 1, the fishing net of the present invention is comprised of a handle 10, a supporting frame work or stock 20, and a net 30. At one end of handle 10 is an enlarged rubber or foam grip 18. The handle 10 is hollow and is usually formed from tubular material. A lightweight material such as thin metal or plastic is preferred. At the other end of handle 10 from the grip 18, a supporting frame work or stock 20 telescopingly extends to the ready for use position or retracts within the handle 10 to a storable position. The stock 20 is comprised of a pair of flexible members 21 and 22, each of which telescope within the handle 10 as will be illustrated in more detail hereinafter. FIG. 1 illustrates the fishing net of the present invention in the extended and operational or ready for use position.

FIG. 2 illustrates the fishing net of the preferred invention where the flexible members 21 and 22 are telescoped within the handle to the retracted and storage position. As clearly shown in FIG. 2, at the end of one of the flexible members 21, is a connector 23 for connecting the flexible members 21 and 22 when in the extended and operational position. In this embodiment, the connector 23 is a metal tube which is crimped to the end of flexible member 22. The flexible members 21 and 22 are thus connected when in the extended position by inserting flexible member 21 into the tube or connector 23. The supporting lines of net 30 are drawn up on flexible members 21 and 22 and the end of the net 30 is wrapped around handle 10. The net 30 may be tied using tie lines 33 which extend from the apex of net 30. A ring or link 35 holds the net 30 on the supporting framework or stock 20. The flexible members 21 and 22 are inserted through ring 35 and at least one supporting line of net 30 is looped through one end of the ring 35. As members 21 and 22 are extended and spread so that they may be connected together and are connected, the supporting lines of net 30 are spaced on flexible members 21 and 22; however, ring 35 is held at the end of handle 10 and also secures the supporting line(s) attached to the ring for easy positioning of the net 30.

Further details of the fishing net of the present invention are shown in FIG. 3. FIG. 3 is a top view without the net 30. As illustrated in FIG. 3, the handle 10 has at one end a grip 18 for easily handling the fishing net of the present invention. The grip also closes one end of the tubular material used in making handle 10. If made of metal, such as aluminum, the other end of handle 10 may be pinched making a portion that comes together at 13 forming two individual passageways 14 and 15. At the pinched portion 13, may be a stop 16, such as a rivet, however, such a stop may not be necessary when pinched portion 13 itself acts as a stop. As shown in FIG. 5, flexible members 21 and 22, which may be solid individual pieces of plastic may be connected at their respective ends by connector 24. The preferred material for the flexible members 21 and 22 is an acetal rod material such as those made from Delrin acetal, a product of DuPont. The preferred connector 24 may be a pin or screw or a crimped piece of metal which secures the ends of the flexible members 21 and 22. Alternatively, the stock means 20 may be made out of a single piece of material split through most of its length to provide the pair of flexible members 21 and 22, respectively.

As seen in FIG. 5, the stock means 20 will be inserted inside handle 10, at the end which is then closed by grip 18, and the individual flexible members 21 and 22 inserted into the passageways 14 and 15 so that flexible member 21 is in passageway 14 and flexible member 22 is in passageway 15. If the handle 10 is made of plastic, the passageways 14 and 15 may be part of the extusion making the handle 10 or a separate piece. When made of plastic, a molded portion of the plastic separating passageways 14 and 15 will serve the same stop function as pinched portion 13. As illustrated in FIG. 5, when the flexible members 21 and 22 are extended, they are limited in their extension from the handle 10, either by pinched portion 13 or by the stop 16 or a molded portion of plastic contacting either the connector or pin 24 holding the flexible members 21 and 22 together or the solid portion of stock 20, hence preventing the connected end or the solid portion of the flexible members 21 and 22 from entering passageways 14 and 15. Also shown in FIG. 5, the grip end of handle 10 may have threads 19 for connecting other handle sections to provide a long handled net.

Another embodiment of the present invention is illustrated in FIGS. 6, 7 and 8. In these embodiments the stock 20 have two flexible members 25 and 26 which are hollow. The connecter in this embodiment is a pin 27 which enables the connecting and disconnecting of the hollow flexible members 25 and 26. This embodiment also illustrates that the handle 10, rather than being of one piece, may be in more than one section. As specifically illustrated in FIG. 7, a section of the handle may be other fishing equipment such as a gig 40. Thus, while the handle is assembled, the gig 40 is easily stored and covers the sharp point 41. Also illustrated in these Figures is that the net in its entirety can be fairly small, short handled or can be an extensive, long handled device suitable for use over a high sided boat.

Since changes, variations and modifications in the form, construction, and arrangements of the elements shown and described may be had without departing from the spirit of the invention, it is understood that the foregoing description is illustrative of the preferred embodiment of the present invention and is not intended to be limiting.

I claim:
1. A fishing net comprising:
handle means which includes one end having two openings and a stop between said openings;
stock means, said stock means having two flexible members, each of which extend from and telescope within one of said openings and joined at the ends within said handle means to prevent extending said flexible members past said stop;
means on the extended end of one of said flexible members for connecting and disconnecting the ends of said members when said members are extended from said handle means; and
a net carried by said flexible members.

2. A fishing net according to claim 1 wherein said handle means includes more than one section.

3. A fishing net according to claim 1 wherein said stock means are rods of acetal plastic.

4. A fishing net according to claim 1 wherein said means for connecting is a tube crimped to said one of said flexible members.

5. A fishing net according to claim 1 wherein said handle means includes a grip.

6. A fishing net according to claim 1 which further includes a link, said link securing at least one line of said net and each of said flexible members extending through said link.

7. A fishing net comprising:
handle means;
stock means, said stock means having two flexible members, each of which telescope within said handle means;
means on one of said flexible members for connecting and disconnecting the ends of said members when said members are extended from said handle means;
a net having loops which are carried by said flexible members; and
a ring through which both flexible members extend and which at least one of said loops of said net is attached.

8. A fishing net according to claim 7 wherein said flexible members are rods of acetal plastic.

9. A fishing net according to claim 8 wherein said handle means is made of aluminum.

10. A fishing net according to claim 7 wherein said means for connecting is a metal tube crimped to said flexible member.

11. A fishing net according to claim 7 wherein said handle means includes more than one section.

12. A fishing net according to claim 7 wherein said handle means includes a grip.

* * * * *